United States Patent

[11] 3,601,655

[72] Inventor Poul H. Andersen
 Royal Oak, Mich.
[21] Appl. No. 40,026
[22] Filed May 25, 1970
[45] Patented Aug. 24, 1971
[73] Assignee Chrysler Corporation
 Highland Park, Mich.

[54] CIRCUIT CONTINUITY MONITORING, WARNING AND PROVING DEVICE
 16 Claims, 2 Drawing Figs.

[52] U.S. Cl. .................................................. 317/9 B,
 307/10 R, 324/51, 340/256, 340/262
[51] Int. Cl. ...................................................... G08b 21/00
[50] Field of Search ........................................... 324/51;
 340/256, 253 B, 61, 262, 421; 307/10 R; 317/9 B

[56] References Cited
UNITED STATES PATENTS
3,215,996  11/1965  Schwartz et al. ............... 340/256 X
3,489,917  1/1970  Gurol ............................ 307/10 X
3,525,038  8/1970  Felt et al. ...................... 340/256 X Primary Examiner—James D. Trammell
Attorney—Talburtt and Baldwin ABSTRACT: A circuit continuity and signal warning device for monitoring the continuity of an electrical circuit controlling the activation of a motor vehicle inflatable occupant restraining system. The monitoring warning device is connected by parallel circuit connections to the existing electrical circuit wiring of the vehicle and the electrical control circuit for the air bag system and provides a signal warning in the event of a circuit discontinuity in the electrical energization circuit, including the electrical detonation device, of the air bag system to warn the operator that the circuit is inoperative and the system is defective. The continuity monitoring device further features a signal proving or checking circuit that is operated each time the motor vehicle is started to prove the operability of the warning device.

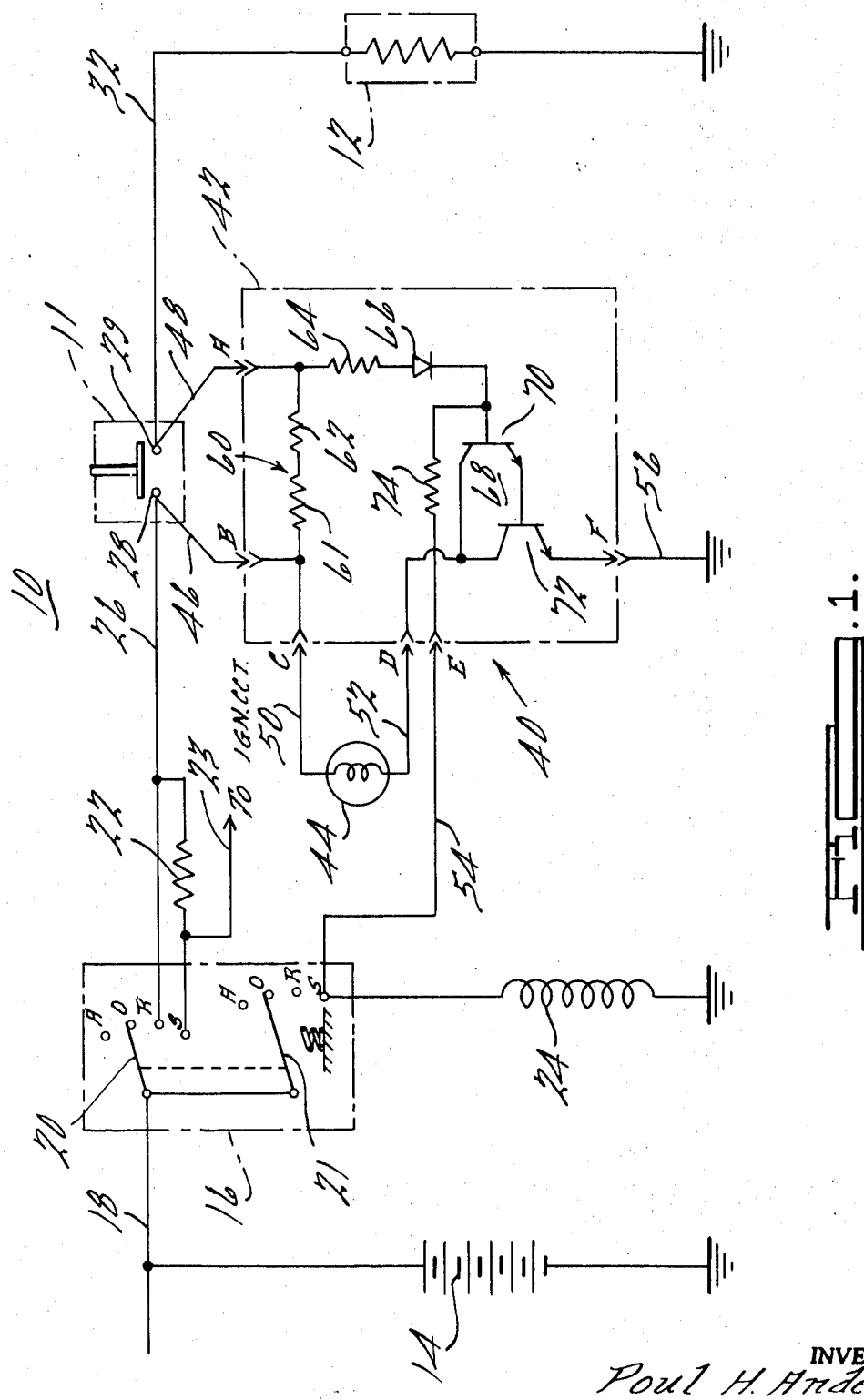

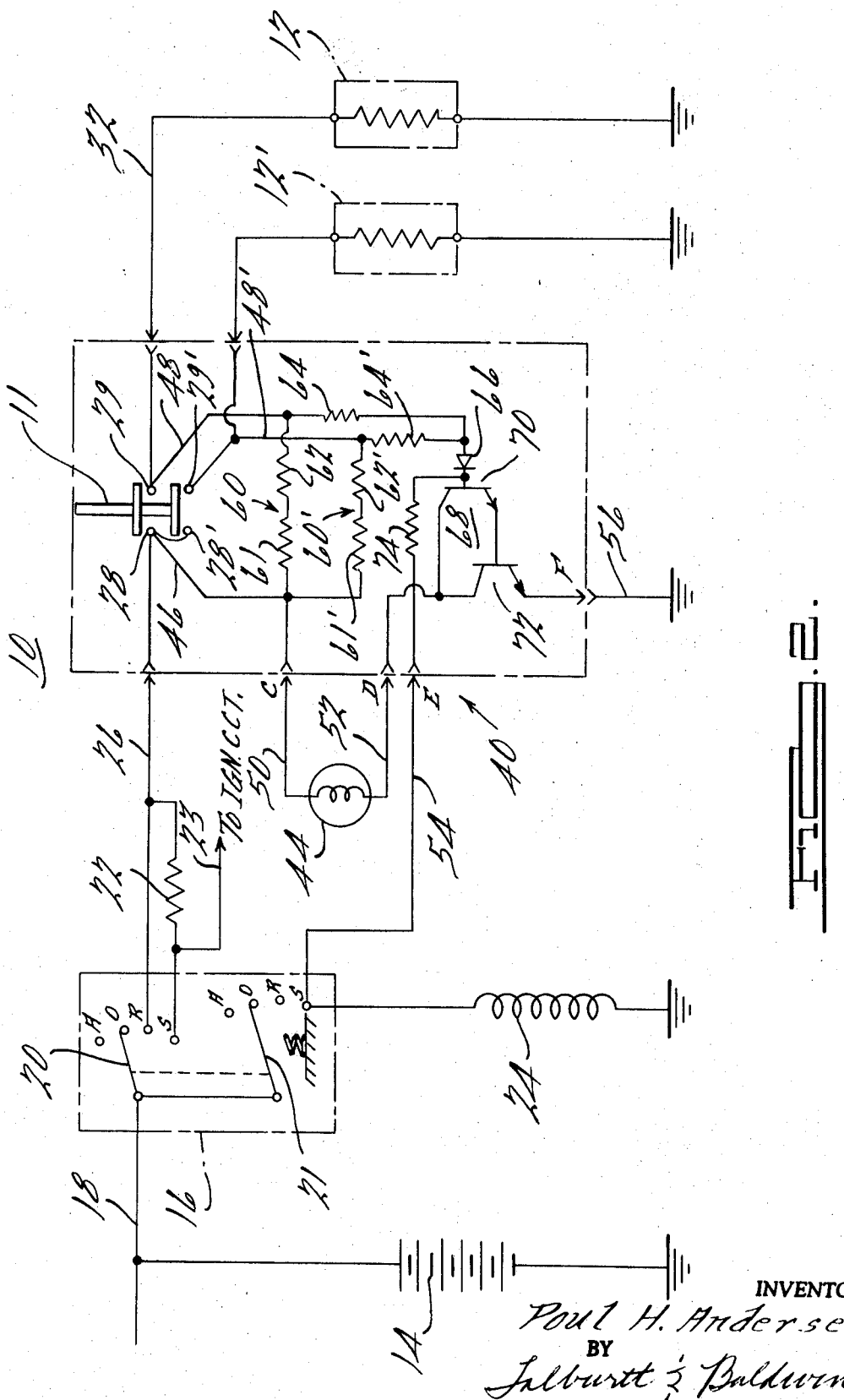

3,601,655

CIRCUIT CONTINUITY MONITORING, WARNING AND PROVING DEVICE

FIELD OF THE INVENTION

This invention relates to signal warning circuit devices for monitoring the continuity of an electrical circuit.

BACKGROUND OF THE INVENTION

The invention is specially, though not exclusively, suited to monitoring and signal warning circuit applications for checking the continuity of electrically energizable circuits, such for example as the actuating circuitry for a motor vehicle inflatable air bag occupant restraining system. Such systems utilize an inertia or collision actuated impact switch to complete an electrical energization circuit to an electrical detonation or squib-type device, which controls the generation and/or release of compressed air or gases in an inflatable air bag carried by the vehicle for protection of the occupants upon high impact collisions.

The invention seeks to provide a continuity monitoring and signal warning circuit device, which is specially suited for use in motor vehicle occupant restraining systems of the character described and provides a signal warning in the event of the occurrence of a circuit discontinuity therein that renders the system inoperative.

A specific object is to provide a continuity monitoring and signal warning circuit for use in such applications and connected by parallel circuit connections to the existing vehicle wiring and to the air bag actuating control circuitry without disruption of the vehicle wiring and the air bag actuating control circuitry.

A related object is to provide a system of the above character, including signal proving means operable each time the motor vehicle is started to prove the operability of the warning circuit.

SUMMARY OF THE INVENTION

Towards the accomplishment of the above and other related objects the invention provides a continuity monitoring, signal warning and proving device, which is responsive to a logic level change in the voltage level at the load connected side of the impact sensor inertia switch upon the occurrence of a circuit discontinuity in the detonation device load circuit connected thereto and operates electrical switching means connected in energizing circuit control relation with an electrical signal warning device. An auxiliary circuit is provided to activate the switching means and signal warning device from an operator controlled switch as the momentarily activatable starting circuit contact section of the vehicle ignition switch to prove the continuity of the signal warning device and switching means controlling the energization thereof.

The structural organization and operation of the invention will appear from the detailed description made with reference to the accompanying drawings, of which FIG. 1 is a schematic electrical circuit diagram of one form of the invention for use with a single load; and FIG. 2 is a schematic electrical circuit diagram of another form of the invention for plural loads.

FIG. 1 illustrates the electrical actuating control and energization circuit 10 for an inflatable air bag occupant restraining system and includes an inertia switch 11 and single electrical detonation device 12 connected for electrical energization from an electrical current source 14 through the vehicle ignition switch 16. The source 14 is shown as the vehicle storage battery connected in a negative ground system, the positive terminal of the battery being connected over conductor 18 to the vehicle ignition switch 16.

The vehicle ignition switch 16 is shown as a double-pole multiple position switch, which is under the manipulative control of the ignition key when inserted and rotated in the keylock cylinder of the motor vehicle. The ignition switch is shown operable between a plurality of positions including an accessory position A, an Off position O, a running position R, and a starting position S. In the running or on position of the ignition switch, the illustrated upper pole 20 of the switch is shown connected through contact S to the conventional ballast resistor 22 customarily provided in conventional automotive ignition systems. The lower pole 21 of the ignition switch is connected with the upper pole to the B+ conductor 18 and is effective in the Start or S position of the ignition switch to energize the motor starting relay 24 for the starting solenoid of the starting motor, neither of the latter components being shown. As in the conventional ignition switch, it will be understood that the starting or contact position S of the switch is a momentary contact position that is enabled or activated only so long as the switch is maintained in that position by the operator to crank the engine, the switch being biased to return to the running or on position when the operator terminates the cranking interval.

The air bag activating circuit 10 is shown connected over conductor 26, which extends from the junction of the indicated contact R of the ignition switch and the load connected side of the ballast resistor 22 to the switch contact terminal 28 of the inertia switch 11. The other switch contact terminal 29 of the switch 11 is connected over circuit conductor 32 to the ungrounded side of the detonation device 12.

It will be understood that the inertia switch, which may be mounted within the vehicle passenger compartment, may be of any conventional and commercially available form and functions to close its switch contacts upon an impact of a predetermined acceleration. The electrical detonation device is an electrical element of relatively low impedance value, say 1 ohm or so, which is adapted to be electrically energized from the current source upon operation of the inertia switch 11, and thermally or otherwise operates to burst or release a frangible seal or valve controlling the release, under high pressure, of a fluid or gaseous medium into the interior of an inflatable structure (not shown).

In accordance with the present invention the continuity of the air bag actuating circuit 10 is monitored whenever the motor vehicle is operating, or, more particularly, whenever the vehicle ignition switch is in an activated or actuated condition. In the drawing, the signal warning and monitoring circuit assembly 40 is illustrated as a six terminal structure comprising a sensing and electronic switching device 42 and a signal warning device 44, of which the latter may be an electrically energizable signal lamp mounted within view of the operator, as on the vehicle instrument panel.

Externally the sensing and switching device 42 is connected from terminal points labeled A–F by several conductors 46, 48, 50, 52, 54 and 56 to existing accessible terminal or connection points of the vehicle wiring and the air bag actuating circuitry, whereby the device is essentially in parallel with existing electrical components of the vehicle and the air bag actuating circuitry. Conductors 46 and 48 connect the device 42 to the switch contacts 28 and 29 respectively of the inertia switch 11; conductors 50 and 52 are shown connected to the remotely located signal warning lamp 44; while conductor 54 is shown connected to the starting contact terminal S of the lower pole 20 of the ignition switch so as to have battery potential applied thereto each time the ignition switch is placed in the momentarily activated engine starting position thereof. Depending upon the construction and packaging of the device 42 and the absence or availability of a case grounded connection therefor, an additional circuit conductor 56 may be provided to ground on the negative side of the battery to furnish the ground return connection for the monitoring and warning assembly 40.

Internally the sensing and switching device 42 comprises a voltage dropping section 60 shown as a pair of resistors 61 and 62, a current limiting resistor 64, an isolation diode 66 and a controlled electronic switching section 68 shown as a pair of NPN transistors 70 and 72. The transistors are shown connected in a current amplifying Darlington configuration with the emitter of the output transistor 72 connected to ground and the collectors connected through terminal D and over external circuit conductor 52 to one side of the signal warning device 44. The other side of the signal warning device is connected over external conductor 50 to terminal C, which is connected internally of the device 42 to the high potential or line connected side of dropping resistor 61, or alternatively may be connected to terminal B.

The resistors 61 and 62 are connected in series and across the terminals 28 and 29 of the inertia switch 11 via external conductors 46 and 48, whereby the resistors are effectively in series with the electrical detonation device 12 constituting the circuit load and form a voltage divider arrangement therewith. The junction of the voltage divider is connected internally of the device 42 to one side of the limiter resistor 64, the other side of which is connected through diode 66 to the base input of the first stage of the Darlington pair. An additional current limiting resistor element 74 is connected between the base input of the Darlington to terminal E, which is connected over external conductor 54 to the terminal of the ignition switch that is connected to the starting relay 24 of the engine starting circuit. Although a single resistor equivalent to the sum of resistors 61 and 62 could be employed in lieu thereof, the use of the two serially connected resistors precludes the possibility of misfiring of the squib 12 in the event of a change in resistance values or should one of the resistors short and also enables the use of resistors of common impedance value for the resistors 61, 62, 64 and 74, all of which may be typically 6,8K ohms, for example.

OPERATION

With the vehicle ignition switch turned on and in the absence of a circuit discontinuity in the circuit comprising conductor 26, switch 11, conductor 32 and the detonation squib device 12, it can be seen that with the inertia switch in open condition, the voltage at the load connected side thereof will be substantially at ground level by reason of its low impedance, approximately 1 ohm, relative to the higher impedance 13.6K, approximately four orders of magnitude, of the voltage dropping resistors 61, 62, which is approximately four orders of magnitude greater than the impedance of the load. The latter resistors limit the current through the detonation device to a level in the order of a milliampere, considerably less than the current level required to activate the squib device. The voltage at the junction of the divider formed by the resistors 61, 62 with the detonation device is supplied over resistor 64 and diode to the input of the electronic switching section 68 and will be below the level necessary to turn on the transistors 70 and 72, whereby the switching section will be nonconducting or off and prevent the energization of the signal warning device 44.

In the event of an open circuit discontinuity in the detonation device or circuit conductor 32 connecting it to the load side of the impact sensor inertia switch 11, the voltage on the load connected side of the inertia switch will rise from substantially ground or zero reference level to approximately 12 volts or the voltage supply. Thus, a B+ level voltage will be applied through limiting resistor 64 to the base of the transistor 70 to activate the switching section 68 turning it on to drop the voltage at the collector output of the switching section slightly above ground level, thereby energizing the signal warning device 44.

In accordance with another aspect of the invention, the circuit monitoring and signal warning system provides a checking or proving signal each time the motor vehicle is started and the ignition switch is placed in the engine starting position. Under such conditions, B+ potential will be applied over conductor 54 and through resistor 74 and diode 66, which prevents forward feed of current from the battery from the proving circuit to the detonator.

The switching section, therefore, is turned on, energizing the signal lamp while the ignition switch is in the start position to indicate the continuity and operability of at least the lamp 44 and switching device 68 and conductors, including conductor 26, connecting the lamp and output section of the switching device across the source. In the event of a discontinuity in any of these elements, or circuit conductors and connections, the indicating lamp will not be energized, thereby signaling to the operator that the lamp will not be energized, thereby signalling to the operator that the lamp is defective or that there is a defect in the circuit that may prevent the operation of the air bag actuating circuitry.

While the illustrated circuit is shown as a negative ground system, the monitoring, warning and proving apparatus is equally adaptable for use in positive ground systems with the appropriate change in conductivity type of the switching device and polarity of the diode. To further increase the reliability of the monitoring system, it is also comprehended that the detector and switching device 42 may be included within the housing of the inertia switch as in the embodiment of FIG. 2 to reduce the number of exposed circuit connections thereto and the length of such circuit conductors.

FIG. 2 illustrates the application of the invention to monitoring a multiplicity of loads or detonation devices 12,12' with a multiple pole inertia switch 11' having electrically isolated output contacts 29,29' each connected by a separate circuit conductor 32,32' to its respectively associated detonating device 12,12'. A separate voltage dropping section 60,60' is employed for each load or detonation device limiting resistor 64' is provided from the output contact of the inertia switch section associated therewith to the input of the switching section 68. The same switching section 68, warning device 44 and checking circuit 54,74 and diode 66 service each of the loads irrespective of the number of such loads.

I claim:

1. A continuity monitoring and signal warning device for an electrical load energizable from an electrical source through an electrical switching device and comprising in combination voltage dropping means connected across said switching device in series with said load to form a voltage divider therewith the voltage at the junction of which is at a first distinct level in the absence of a circuit discontinuity between the switching device and the electrical load, including the electrical load, and is at a second distinct level in the presence of such a discontinuity, an electrically energizable signalling device, and switching means connected in energizing circuit control relation with said signalling device across said electrical source and responsive to a change in the voltage level at the voltage divider junction from said first level to said second level to actuate said switching means for energization of said signal warning device.

2. The combination in accordance with claim 1 wherein said voltage dropping means presents an electrical circuit impedance much greater than that of said load.

3. The combination in accordance with claim 2 wherein said switching means is connected to the junction of said voltage dropping means and said electrical load.

4. The combination in accordance with claim 1 wherein said continuity monitoring and signal warning device includes a checking circuit connected between said source and said switching means for application of an actuating voltage thereto to test the operability of the signalling device and switching means upon selective application of said actuating voltage thereto.

5. The combination in accordance with claim 4 including a normally open electrical switch in said checking circuit.

6. The combination in accordance with claim 3 wherein said switching means has an input control section connected in circuit to the junction of said voltage dropping means and said electrical load and has a controlled output section connected in energizing control relation with the signal warning device.

7. The combination in accordance with claim 6 including feedback preventing means between said checking circuit and the junction of said voltage dropping means and said electrical load to prevent forward feed of current from the checking circuit to said electrical load.

8. The combination in accordance with claim 7 above wherein said feedback preventing means includes a unilateral conducting device between said voltage divider junction and the input of said switching device.

9. The combination in accordance with claim 6 wherein said switching device is an electronic switching device.

10. The combination in accordance with claim 1 above wherein said voltage dropping means includes a pair of resistors connected in series across said first mentioned electrical switching device.

11. The combination in accordance with claim 5 above adapted for a motor vehicle and wherein said normally open electrical switch in said checking circuit is a momentary contact switch that is operated each time the motor vehicle is started.

12. The combination in accordance with claim 11 above wherein said motor vehicle includes an electrical ignition switch and wherein the momentary contact switch is part of the ignition switch of the motor vehicle.

13. The combination in accordance with claim 1 wherein said load device is a low impedance detonation squib and the first mentioned electrical switch is an inertia switch actuated by collision impact of the vehicle.

14. The combination in accordance with claim 1 including a plurality of electrical loads each independently energizable from said source and simultaneously monitored by the continuity monitoring and signal warning device.

15. The combination in accordance with claim 14 wherein said electrical switching device has a plurality of simultaneously activatable, but electrically isolated output switching contacts each connected to a different one of said electrical loads and wherein a separate voltage dropping means is connected to the switching device for each of said electrical loads and to the switching means of the continuity monitoring and signal warning device.

16. The combination in accordance with claim 15 wherein the same signalling device is used with said continuity monitoring and signal warning device for each of the loads monitored thereby and further includes a common checking circuit connected between said source and said switching means to test the operability of the signalling device and switching means.

UNITED STATES PATENT OFFICE
CERTIFICATE OF CORRECTION

Patent No. 3,601,655          Dated August 17, 1971

Inventor(s) Poul H. Andersen

It is certified that error appears in the above-identified patent and that said Letters Patent are hereby corrected as shown below:

Column 4, line 30, after "device" insert -- connected to the switch contacts as shown and an additional circuit --.

Signed and sealed this 29th day of August 1972.

(SEAL)
Attest:

EDWARD M. FLETCHER, JR.　　　　　　　ROBERT GOTTSCHALK
Attesting Officer　　　　　　　　　　Commissioner of Patents